US010277653B2

(12) United States Patent
Narayanan et al.

(10) Patent No.: US 10,277,653 B2
(45) Date of Patent: *Apr. 30, 2019

(54) FAILURE DETECTION MANAGER

(71) Applicant: Juniper Networks, Inc., Sunnyvale, CA (US)

(72) Inventors: Karthik Narayanan, Chennai (IN); Sunil Mukundan, Chennai (IN); Satheesh Ramalingam, Chennai (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/595,424

(22) Filed: May 15, 2017

(65) Prior Publication Data

US 2017/0251038 A1 Aug. 31, 2017

Related U.S. Application Data

(63) Continuation of application No. 13/725,058, filed on Dec. 21, 2012, now Pat. No. 9,654,527.

(51) Int. Cl.
*G06F 13/00* (2006.01)
*H04L 29/06* (2006.01)
(Continued)

(52) U.S. Cl.
CPC ............. *H04L 65/60* (2013.01); *G06F 9/382* (2013.01); *G06F 11/0736* (2013.01); *G11B 20/10527* (2013.01); *H04H 20/12* (2013.01); *H04L 12/1827* (2013.01); *H04L 12/1831* (2013.01); *H04L 65/4084* (2013.01); *H04L 65/80* (2013.01); *H04L 69/40* (2013.01)

(58) Field of Classification Search
CPC ..... H04L 65/60; H04L 12/1831; H04L 69/40; H04L 12/1827; H04L 65/4084; H04L 65/80; G06F 9/382; G06F 11/0736; G11B 20/10527; H04H 20/12
USPC ................. 709/220–222, 213–215, 231, 235
See application file for complete search history.

(56) References Cited

U.S. PATENT DOCUMENTS 7,779,142 B1 * 8/2010 Greene ............... H04L 12/2801
                                                        370/235
8,532,999 B2   9/2013 Neusinger et al.
(Continued)

OTHER PUBLICATIONS

Tao et al., "Application-Specific Path Switching: A Case Study for Streaming Video", Proceedings of the 12th annual ACM international conference on Multimedia, Oct. 10, 2004, 8 pages.
(Continued)

*Primary Examiner* — Kenneth R Coulter
(74) *Attorney, Agent, or Firm* — Harrity & Harrity, LLP

(57) ABSTRACT

A network device is configured to receive information regarding a group of content streams and determine a buffer size for each of the content streams. The network device is further configured to receive the content streams from one or more encoding devices. The network device is further configured to buffer an amount of each of the content streams based on the respective buffer size. The network device is further configured to send a first content stream to a user device. The network device is further configured to determine that the first content stream has a quality of experience issue and send the second content stream to the user device.

20 Claims, 6 Drawing Sheets

(51) Int. Cl.
*H04L 12/18* (2006.01)
*G11B 20/10* (2006.01)
*G06F 9/38* (2018.01)
*G06F 11/07* (2006.01)
*H04H 20/12* (2008.01)
*H04L 29/14* (2006.01)

(56) References Cited

U.S. PATENT DOCUMENTS

| | | | |
|---|---|---|---|
| 8,874,634 B2* | 10/2014 | Ramamurthy | H04L 65/80 |
| | | | 709/201 |
| 9,420,023 B2* | 8/2016 | Ramamurthy | H04L 65/80 |
| 9,654,527 B1* | 5/2017 | Narayanan | H04L 65/60 |
| 2003/0182437 A1 | 9/2003 | Kobayashi et al. | |
| 2006/0080482 A1 | 4/2006 | Dixon | |
| 2006/0224784 A1* | 10/2006 | Nishimoto | G06F 3/0611 |
| | | | 710/36 |
| 2008/0040453 A1 | 2/2008 | Cohen | |
| 2008/0240004 A1 | 10/2008 | Shaffer et al. | |
| 2009/0003247 A1 | 1/2009 | Katis | |
| 2010/0033635 A1 | 2/2010 | Stumpf | |
| 2010/0064055 A1 | 3/2010 | Krikorian | |
| 2010/0091888 A1 | 4/2010 | Nemiroff | |
| 2011/0202674 A1 | 8/2011 | Su et al. | |
| 2012/0321278 A1 | 12/2012 | Walker | |
| 2013/0058480 A1 | 3/2013 | Ziskind | |
| 2013/0061040 A1 | 3/2013 | Kiefer | |
| 2013/0232228 A1* | 9/2013 | Ramamurthy | H04L 65/80 |
| | | | 709/219 |
| 2013/0275611 A1* | 10/2013 | Somekh | H04N 21/251 |
| | | | 709/231 |
| 2014/0074719 A1 | 3/2014 | Gressel et al. | |
| 2014/0078401 A1 | 3/2014 | Seigneurbieux | |
| 2015/0046571 A1* | 2/2015 | Ramamurthy | H04L 65/80 |
| | | | 709/219 |
| 2016/0359938 A1* | 12/2016 | Ramamurthy | H04L 65/80 |

OTHER PUBLICATIONS

Yuan et al., "User-Oriented QoE-Driven Server Selection for Multimedia Service Provisioning in Dontent Distribution Networks", IEEE 26th International Symposium on Personal, Indoor and Mobile Radio Communications, 2015, 6 pages.

Lotfallah et al., "Adaptive Bitstream Switching of Pre-encoded PFGS Video", Nov. 11, 2005, 10 pages.

Santos Jr., "Design and Implementation of a communication protocol to improve multimedia Qos and QOE in wireless AD hoc networks", 2016, 4 pages.

Paudyal et al., "Impact of video content and transmission impairments and quality of experience", Multimedia Tools and Applications, Dec. 2016, vol. 75, Issue 23, pp. 16461-16485.

Narayanan et al., "Multiple Stream Adaptive Bit Rate System", U.S. Appl. No. 12/978,384, filed Dec. 23, 2010, 30 pages.

* cited by examiner

FAILURE DETECTION MANAGER

RELATED APPLICATION

This application is a continuation of U.S. patent application Ser. No. 13/725,058, filed Dec. 21, 2012 (now U.S. Pat. No. 9,654,527), the disclosure of which is incorporated herein by reference.

BACKGROUND

A user device (e.g., a smart phone, a laptop, etc.) may receive content from a content server (e.g., a video content server) via an encoding device and a network device. If the encoding device fails to function, then the user device and/or the network device may send a request to another encoding device to provide service. The other encoding device may receive the request and take over the operation of the failed encoding device so that the user device may continue to receive the content from the content server.

SUMMARY

According to some example implementations, a network device may receive information regarding content streams; determine a buffer size for each of the content streams based on the information; receive the content streams from encoding devices; buffer each of the content streams based on the respective buffer size; send a first content stream, being one of the content streams, to a user device; determining that the first content stream has a quality of experience issue; send a second content stream, being one of the content streams, to the user device instead of sending the first content stream to the user device based on determining that the first content stream has the quality of experience issue, the buffer size, for the first content stream, permitting a switchover from the first content stream to the second content stream, to occur without the quality of experience issue being experienced by the user device; and send the second content stream to the user device instead of the sending the first content stream.

According to some example implementations, a method, performed by a network device, may include receiving information regarding a first content stream and a second content stream; determining a buffer size for the first content stream based on the information; receive the content streams from encoding devices; buffering an amount of the first content stream based on the buffer size; sending the first content stream to a user device; determining that the first content stream has a quality of experience issue; receiving the second content stream; and sending the second content stream to the user device instead of sending the first content stream to the user device based on determining that the first content stream has the quality of experience issue, the buffer size, for the first content stream, permitting a switchover from the first content stream to the second content stream, to occur without the quality of experience issue being experienced by the user device.

According to some example implementations, a computer-readable medium may include a group of instructions which, when executed by one or more processors of a network device, cause the one or more processors to receive information regarding content streams; determine a buffer size for each of the content streams based on the information; receive the content streams from encoding devices; buffer each of the content streams based on the respective buffer size; send a first content stream, being one of the content streams, to a user device; determining that the first content stream has a quality of experience issue; send a second content stream, being one of the content streams, to the user device instead of sending the first content stream to the user device based on determining that the first content stream has the quality of experience issue, the buffer size, for the first content stream, permitting a switchover from the first content stream to the second content stream, to occur without the quality of experience issue being experienced by the user device.

BRIEF DESCRIPTION OF DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements.

According to an implementation described herein, a quality of experience ("QoE") detection manager may buffer multiple content streams so that in the event that the QoE detection manager detects a QoE issue (e.g., jitter, packet loss, etc., for a content stream or the failure of an encoding device, associated with a content stream), the QoE detection manager may switch over to another content stream to prevent any QoE issues for a user, of a user device, that may be viewing and/or listening to content associated with the content stream.

Figure 1:
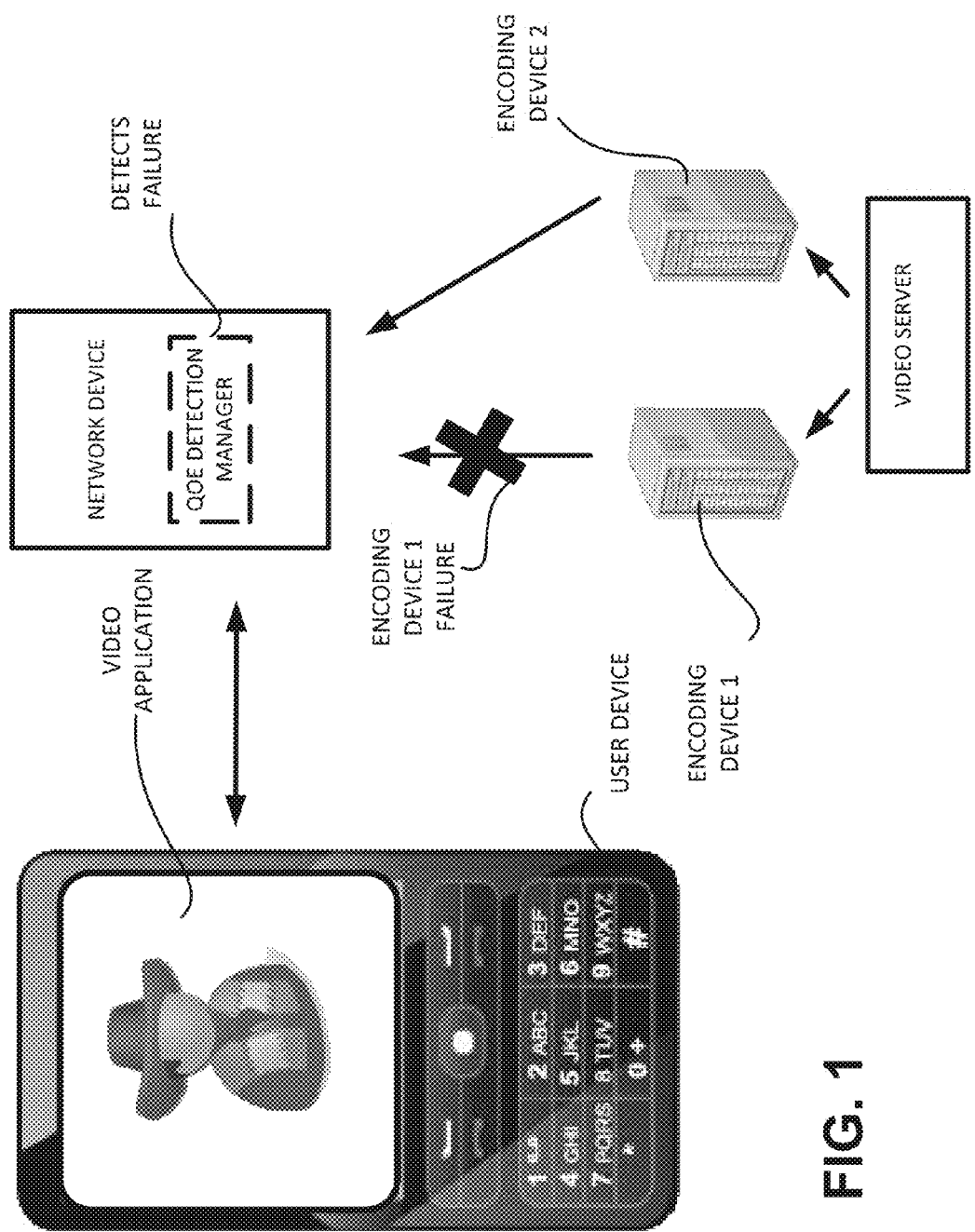
FIG. 1 is a diagram of an overview of an implementation described herein.

FIG. 1 is a diagram of an overview of an implementation described herein. As shown in FIG. 1, a user, of a user device, may be using a video application (downloaded on the user device) to watch a movie. The movie content is sent from a video server to an encoding device (shown as "encoding device 1"). Encoding device 1 may encode the movie content so that the movie content is compatible for use on the user device. Encoding device 1 may send the movie content to a network device and the network device may send the movie content to the user device. Assume that another encoding device (shown as "encoding device 2") is used in the event that encoding device 1 fails and that encoding device 2 is not actively receiving movie content from the video server.

A QoE detection manager, executing on the network device, may receive information about the movie content arriving from encoding device 1. This information may include bitrate values, arrival times, data size of the movie content, and/or other types of information. The QoE detection manager may store information indicating that if encoding device 1 fails, then encoding device 2 will provide the movie content to the network device. Assume that the QoE detection manager determines that the switchover time (in the event of the failure of encoding device 1) from encoding device 1 to encoding device 2 is four seconds based on the amount of time to activate encoding device 2, for encoding device 2 to receive the movie content from the video server, and/or for the network device to receive the movie content from encoding device 2. The QoE detection manager may determine that to minimize any QoE issues for the user, of the user device, the movie content being received from encoding device 1 should be buffered. The amount of buffering used may minimize or eliminate any QoE issues for the user watching the movie content when switching from encoding device 1 to encoding device 2.

Assume that as the user is watching the movie on the user device, there is a failure of encoding device 1. The QoE detection manager, on the network device, may detect the failure of encoding device 1. The QoE detection manager may communicate with encoding device 2 to request encoding device 2 to send the movie content to the network device. Encoding device 2, based on receiving the message, becomes activated and requests the movie content from the video server. The video server sends the movie content to encoding device 2. Encoding device 2 may send the movie content to the network device and the network device may send the movie content to the user device. Because the QoE detection manager buffered the movie content stream from encoding device 1, there is no loss of QoE (e.g., no pixelating, audio skipping, etc.) for the user as the user is watching the movie.

By implementing a system that may detect and resolve issues associated with QoE, the system may reduce or eliminate QoE issues (e.g., encoding device failures, jitter, packet losses, etc., associated with sending content through a network, and/or other QoE issues) for the user of the user device. This may permit the network to provide a greater level of QoE to the users of the network.

Figure 2:
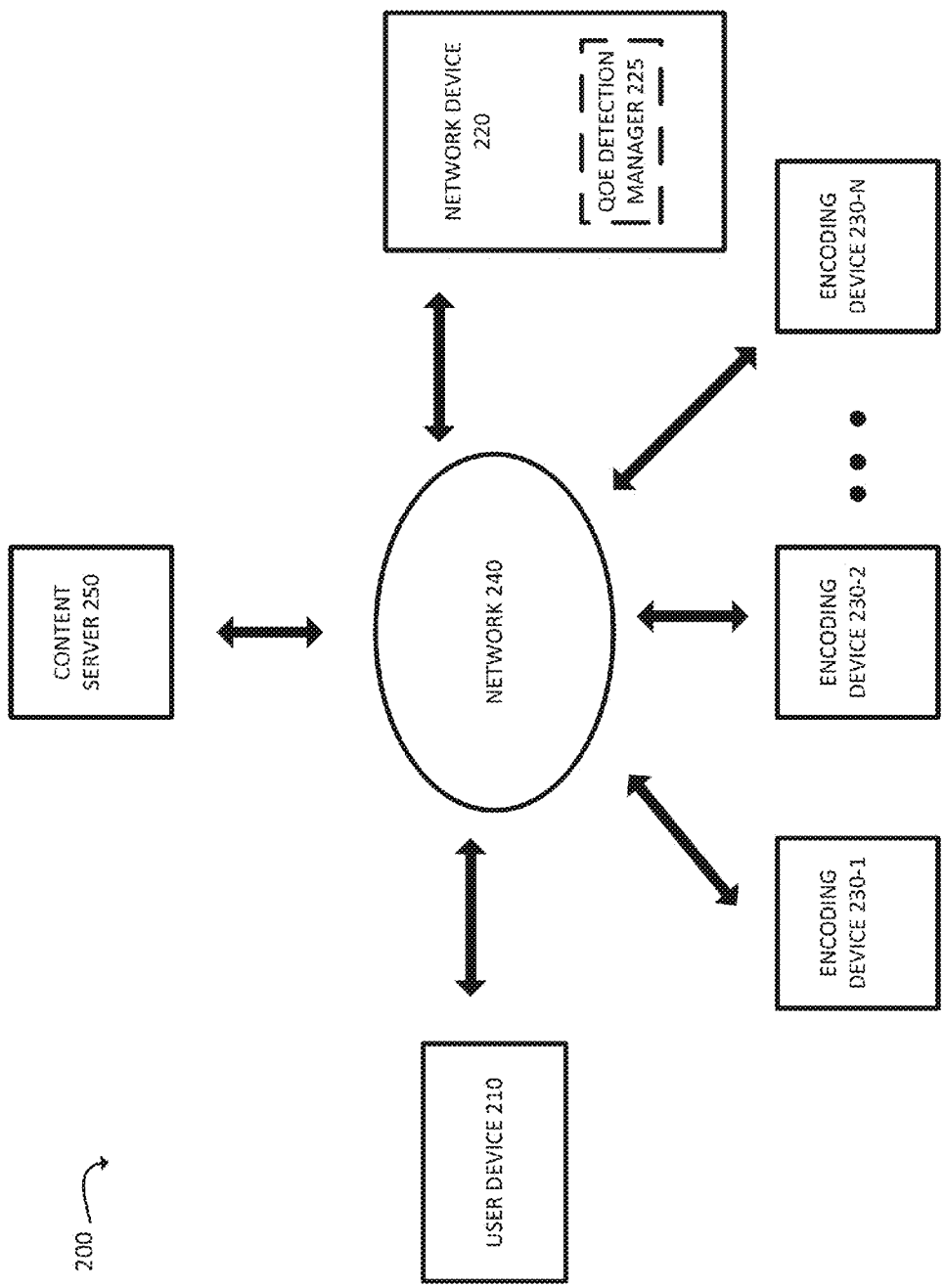
FIG. 2 is a diagram of an example environment in which systems and/or methods described herein may be implemented.

FIG. 2 is a diagram of an example environment 200 in which systems and/or methods described herein may be implemented. In some implementations, environment 200 may include a collection of devices associated with a private network, such as a corporate network, a residential network, or the like. In some implementations, environment 200 may include a collection of devices associated with a public network or a combination of a private network and a public network.

As shown in FIG. 2, environment 200 may include a user device 210, a network device 220, QoE detection manager 225, encoding device 230-1, 230-2, . . . , 230-N (N>1) (collectively referred to as "encoding devices 230" and individually as "encoding device 230"), a network 240, and a content server 250.

User device 210 may include any computation or communication device, such as a wireless mobile communication device that is capable of communicating with a network (e.g., network 240). For example, user device 210 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a personal computer, a laptop, a tablet computer, a personal gaming system, a set top box, or another computation, or communication device.

User device 210 may include a variety of applications, such as, for example, an e-mail application, a video application, a multi-media application, a music player application, a web browsing application, and/or other types of applications.

Network device 220 may include one or network devices, which may be used within a network, such as a switching device, a core router device, an edge router device, a gateway device, a bridge device, a publishing device, or the like. Network device 220 may be located at the head-end of network 240 (e.g., a facility that originates content, such as a cable television head-end that receives television signals and distributes the television content through the cable network), at the edge of network 240, in the core of network 240, or any other part of network 240.

QoE detection manager 225 may include an application that is stored on and/or executed by network device 220. QoE detection manager 225 may detect and rectify QoE issues occurring within network 240. QoE detection manager 225 may buffer a particular content stream from a particular encoding device 230 to prevent any loss in QoE to a user using user device 210 when switching from one content stream to another content stream. QoE detection manager 225 may be run by multiple network devices 220. In such an implementation, QoE detection manager 225 may be executed in a distributed manner, such as by executing on multiple network devices 220 simultaneously. QoE detection manager 215 may be associated with one or more encoding devices 230.

Encoding device 230 may include a network device, such as an encoder, that encodes a content stream for transmission, storage, and/or encrypts the content stream. Encoding device 230 may decode the content stream for playback and/or editing and send the content stream of across network 240. Encoding device 230 may receive a feed (e.g., a video feed, an audio feed, or a multimedia feed) from content server 250 and encoding device 230 may split the feed into one or more content streams to encode different content streams with in different manners (e.g., different levels of QoS, different bitrates, different languages, etc.). A content stream may be associated with video content, audio content, multimedia content, and/or any other type of content. Encoding device 230 may encode the content stream into different video formats, such as MPEG-2, transport stream ("TS"), H/2.64 advanced video coding ("H.264/AVC"), and/or other types of video formats. Encoding device 230 may encode the content stream into different audio formats such as MPEG-4 audio lossless coding, codec 2, and/or other types of audio formats.

Network 240 may include one or more networks, such as a wide area network (WAN) (e.g., the Internet), a local area network (LAN), a metropolitan area network (MAN), a telephone network (e.g., the Public Switched Telephone Network (PSTN) or a cellular network), an Internet Protocol television system ("IPTV system"), a satellite network, or a combination of networks. In some implementations, network 240 may correspond to a private network, a public network, or a combination of a private network and public network.

Content server 250 may include one or more server devices that may provide video content, audio content, and/or multimedia content sent, via encoding device 230 and network device 220, to user device 210.

The example quantity and configuration of devices illustrated in FIG. 2 are provided for simplicity. In practice, there may be additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
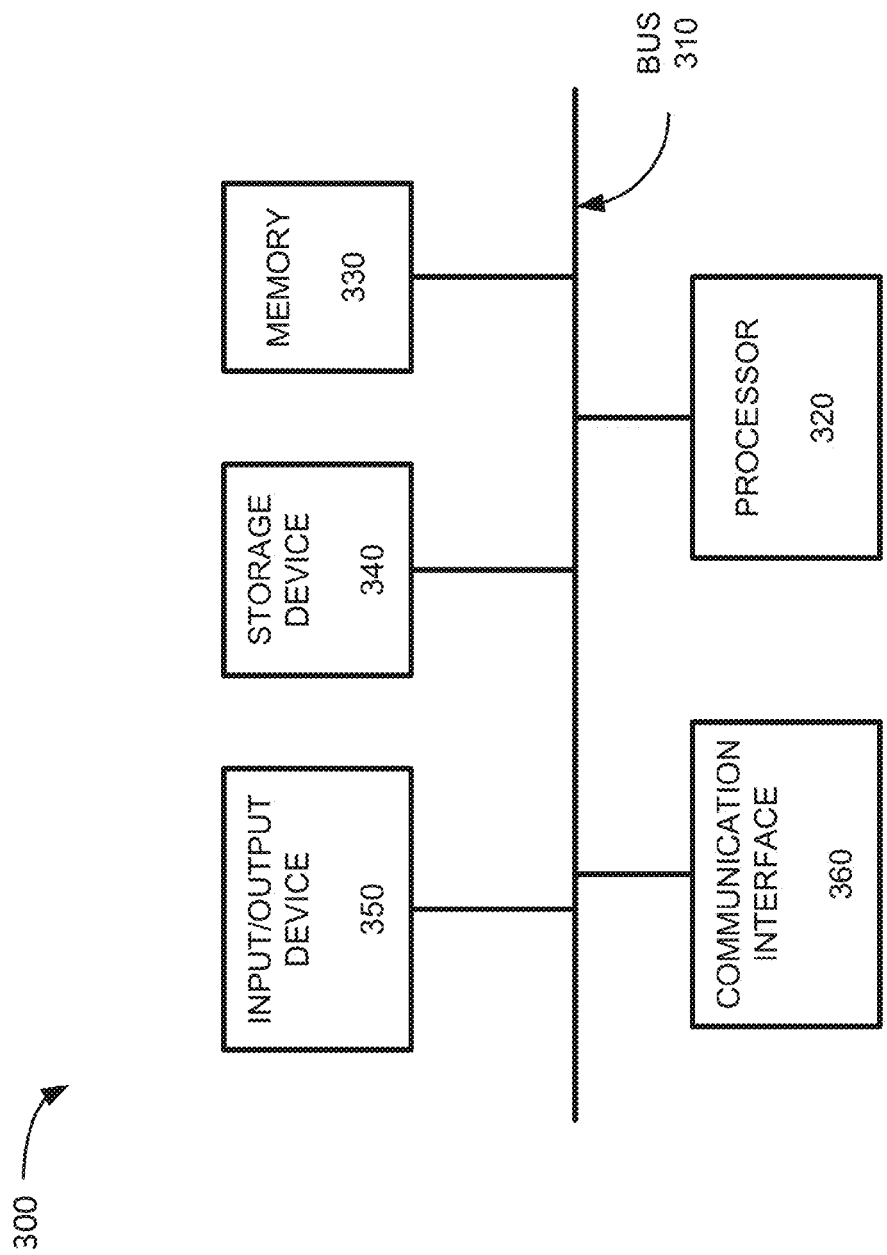
FIG. 3 is a diagram of example components of one or more devices of FIG. 2.

FIG. 3 is a diagram illustrating example components of a device 300. Device 300 may correspond to one or more of the devices illustrated in FIG. 2. For example, user device 210, network device 220, encoding device 230, and content server 250 may include one or more devices 300 and/or one or more components of device 300.

As shown in FIG. 3, device 300 may include a bus 310, a processor 320, a memory 330, a storage device 340, an input/output device 350, and a communication interface 360. Bus 310 may include a path, or a collection of paths, that permits communication among the components of device 300.

Processor 320 may include a processor, a microprocessor, an application specific integrated circuit (ASIC), a field programmable gate array (FPGA), or another type of processing component that interprets and executes instructions. Memory 330 may include a random access memory (RAM) or another type of dynamic storage device that stores information and/or instructions for execution by processor 320; a read only memory (ROM) or another type of static storage device that stores static information and/or instructions for use by processor 320; and/or another type of memory, such as a hard drive, a cache, or a flash memory. Storage device 340 may include a recording medium to store data that may be used by processor 320.

Input/output device 350 may include a component that permits an operator to input information to device 300, such as a button, a keyboard, a keypad, a touch screen display, or the like; and/or a component that outputs information to the operator, such as a light emitting diode (LED), a display, a speaker, or the like.

Communication interface 360 may include any transceiver-like component that enables device 300 to communicate with other devices and/or systems. For example, communication interface 360 may include a separate transmitter and receiver, or a transceiver that combines the functionality of both a transmitter and a receiver. Communication interface 360 may include a wired interface, a wireless interface, or both a wired interface and a wireless interface.

Device 300 may perform certain operations, as described in detail below. According to an example implementation, device 300 may perform these operations in response to processor 320 executing sequences of instructions contained in a computer-readable medium, such as memory 330. A computer-readable medium may be defined as a non-transitory memory device. A memory device may include memory space within a single physical storage device or memory spread across multiple physical storage devices.

The software instructions may be read into memory 330 from another computer-readable medium, such as storage device 340, or from another device via communication interface 360. The software instructions contained in memory 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

While FIG. 3 shows device 300 as having a particular quantity and arrangement of components, in some implementations, device 300 may include additional components, fewer components, different components, or differently-arranged components.

Figure 4A:
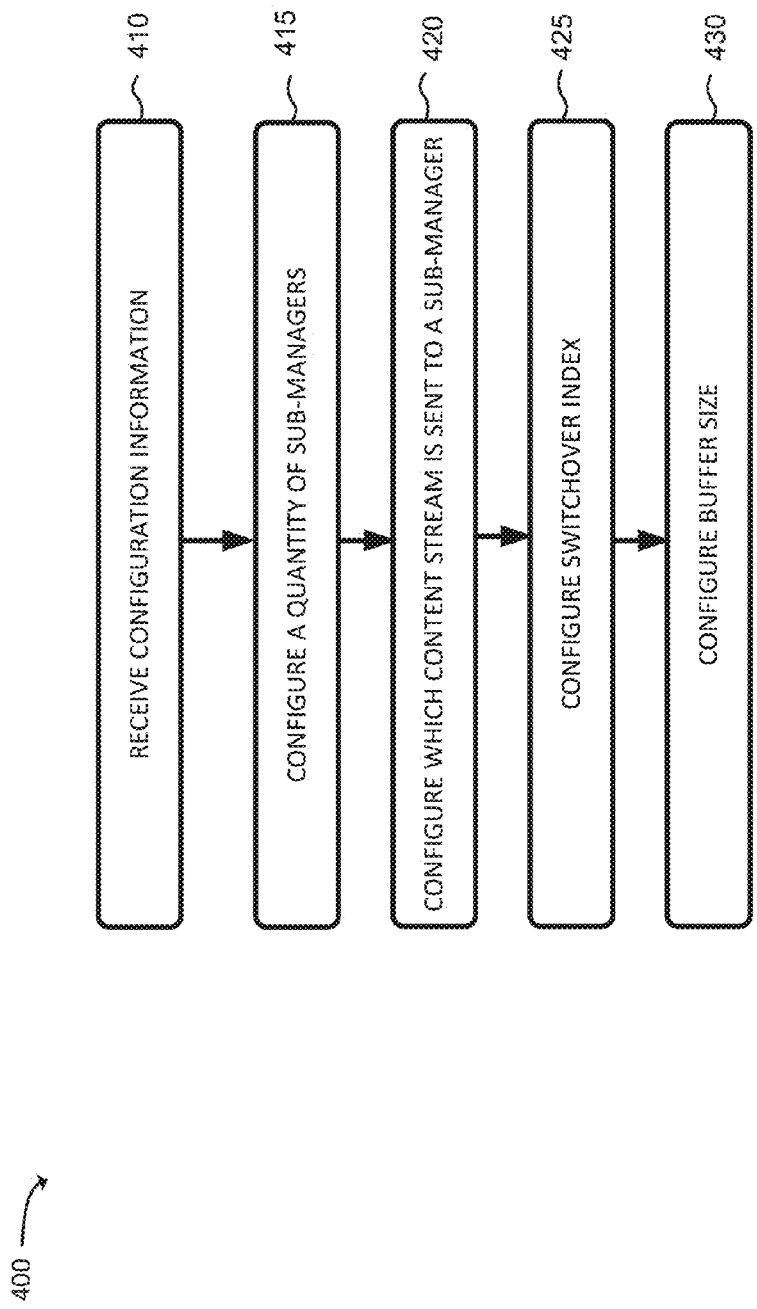
FIG. 4A is a flow chart of an example process for configuring a quality of experience detection manager.

FIG. 4A is a flow chart of an example process 400 for configuring a QoE detection manager. In one example implementation, process 400 may be performed by network device 220. In another example implementation, one or more blocks of process 400 may be performed by one or more other devices, such as encoding device 230.

Process 400 may include receiving configuration information (block 410). For example, QoE detection manager 225 may receive configuration information from network device 220, another network device (e.g., a network management device associated with network 240) within network 240, and/or an operator of network device 220. The configuration information may include the quantity of encoding devices 230 and/or content streams to associate with QoE detection manager 225; which encoding devices 230 to associate with QoE detection manager 225; which content streams to be received by QoE detection manager 225; which encoding device 230 is to switch over to which other encoding device 230 in the event of the failure of encoding device 230; which content stream is to switch over to which other content stream in the event of a QoE issue relating to a content stream; and/or other information.

Process 400 may include configuring a quantity of sub-managers (block 415). For example, QoE detection manager 225 may be configured with a quantity of sub-managers. The quantity of sub-managers may be configured by instructions received from network device 220, from an operator of network device 220, and/or from another network device. A sub-manager receives a particular content stream from a particular encoding device 230 and buffers the content stream. A sub-manager receives instructions and information from QoE detection manager 225.

Process 400 may include configuring which content stream is sent to a sub-manager (block 420). For example, QoE detection manager 225 may provide instructions to each sub-manager so that each sub-manager receives a particular content stream from a particular encoding device 230. QoE detection manager 225 may receive the instructions from network device 220, from an operator of network device 220, and/or from another network device.

For example, one sub-manager may be configured to receive a content stream, from encoding device 230, that has a QoS level of QoS class identifier ("QCI") 1 and another sub-manager may be configured to receive a content stream, from encoding device 230, that has a QoS level of QCI 2.

Additionally, or alternatively, each sub-manager may be configured to receive a content stream from a different encoding device 230. For example, one sub-manager may be configured to receive a content stream that includes closed captioning in a particular language (e.g., French) from a first encoding device 230 and another sub-manager may be configured to receive the same content stream, but without any closed captioning in the particular language, from a second encoding device 230.

Additionally, or alternatively, each sub-manager may be configured to receive a content stream associated with a different type of content. For example, one sub-manager may be configured to receive a content stream associated with audio content and another sub-manager may be configured to receive a content stream associated with video content.

Process 400 may include configuring a switchover index (block 425). For example, QoE detection manager 225 may determine that a first content stream is to switch over to a second content stream in the event of the occurrence of a QoE issue associated with the first content stream. Additionally, QoE detection manager 225 may instruct network device 220 to send the second content stream to user device 210 in the event of the occurrence of the QoE issue associated with the first content stream.

QoE detection manager 225 may receive information from a sub-manager regarding a QoE issue associated with a content stream, such as packet loss, jitter, and/or other QoE issues. QoE detection manager 225 may determine that the switchover from one content stream to another content stream may occur if the QoE issue is associated with a value that satisfies a threshold value (stored by QoE detection manager 225). For example, QoE detection manager 225 may receive information from a sub-manager that a content stream has a jitter value of 30 ms. QoE detection manager 225 store information that if the jitter value exceeds 30 ms, then QoE detection manager 225 may switch to a different content stream and send the different content stream to user device 210.

Additionally, or alternatively, QoE detection manager 225 may be configured to switch to another content stream when QoE detection manager 225 receives content stream information, from a sub-manager, that the QoE issue is associated with a content stream that is not compatible with hardware associated with user device 210 (e.g., user device 210 may not have the ability to transcode a particular video format, such as digital video broadcast). QoE detection manager 225 may switch to a different content stream that is compatible with the hardware associated with user device 210.

Additionally, or alternatively, QoE detection manager 225 may determine that the QoE issue is that there is no content stream being received by a sub-manager due to a failure of encoding device 230. For example, if a sub-manager does not receive a content stream for a particular amount of time (e.g., 0.02 seconds, 0.01 seconds, 0.04 seconds) after commencing to send the content stream to user device 210, then QoE detection manager 225 may be configured to determine that there is a failure of encoding device 225 and QoE detection manager 225 may be configured to switch to another content stream (e.g., the same content stream from another encoding device 225).

QoE detection manager 225 may be configured to switch content streams from different encoding devices 230 that are located in a similar geographic area. For example, if encoding device 230 has failed and encoding device 230 is located in the Miami geographic area of the network, then QoE detection manager 225 may be configured to switch over to another encoding device 230 that is also located in the Miami geographic area of the network.

QoE detection manager 225 may be configured to switch from one content stream to another content stream based on the characteristics of the content stream. For example, if a content stream has video with closed captioning, then in the event of a QoE issue occurring with the content stream, then QoE detection manager 225 may be configured to switch over to another content stream that also has the same video with closed captioning.

Process 400 may include configuring a buffer size (block 430). For example, QoE detection manager 225 may receive information from network device 220, encoding device 230, and/or other devices, regarding the bit rates, latency values, and/or other information associated with different content streams. QoE detection manager 225 may send the information for a particular content stream to a sub-manager associated with the particular content stream. The sub-manager may use the information to determine the buffer size to use for a particular content stream. The buffer size may refer to the amount of buffering to perform for a given content stream.

In some example implementations, the sub-manager may use the following formula to determine the buffer size ($B^k_i$):

$$B^k_i = Q \times l_i \times b^k \quad (Q \geq 1)$$

In the example formula, "Q" may refer to the amount of data associated with the content stream (e.g., 50 MB, 100 MB, 2 GB, etc.). In the example formula, "$l_i$" may refer to the inter-arrival latency which is the time difference between the arrival rates of different content streams. QoE detection manager 225 may determine the inter-arrival latency value (e.g., via communications with encoding devices 230), and provide this value to each sub-manager. In the example formula, "$b^k$" may refer to the bitrate which is the number of bits processed per unit of time (e.g., 100 kbits/second, 24 kbits/second, 50 kbits/second, etc.). In the example formula, the "k" variable may be associated with the total number of content streams being analyzed by QoE detection manager 225. QoE detection manager 225 may provide the "k" value to the sub-manager. In the example formula, the "i" variable may be associated with a particular content stream. While the above formula has the above-defined variables, the formula may have fewer of the above-defined variables and/or different variables.

In some example implementations, QoE detection manager 225 may be configured to use the following formula to determine the inter-arrival latency ($l_i$):

$$l_i = 1/(R) \times \Sigma_i (r=1)^R \equiv (t_{max}r - t_{min}r)$$

In the example formula, "R" may refer to the number of iterations and "r" may refer to a particular iteration. In the example formula, "$t_{max}r$" may refer to a maximum amount of time associated with the arrival time of a content stream. In the example formula, "$t_{min}r$" may refer to a minimum amount of time associated with the arrival time of a content stream. In the example formula, ($t_m r - t_{min} r$) may refer to a range of arrival times for a content stream. QoE detection manager 225 may model the inter-arrival latency over the maximum period of time to determine the switchover time from one content stream to another content stream. QoE detection manager 225 may communicate the inter-arrival latency value to a sub-manager so that the sub-manager may determine a buffer size for a particular content stream. While the above formula has the above-defined variables, the formula may have fewer of the above-defined variables and/or different variables.

In some example implementations, QoE detection manager 225 may use the following formula to determine the buffer size ($B^k_i$) for switching from an active encoding device 230 to an inactive encoding device 230:

$$B^k_i = Q \times l_t \times b^k$$

In this example formula, "Q" may refer to an amount of data associated with a content stream. In this example formula, "$l_t$" may refer to the inter-arrival latency associated with switching from a content stream associated with an active encoding device 230 to a content stream associated with an inactive encoding device 230. QoE detection manager 225 may provide a value for "$l_t$" to each sub-manager. In the example formula, "$b^k$" may refer to the bitrate. In this example formula, the "k" variable may be associated with the total number of content streams being analyzed by QoE detection manager 225. QoE detection manager 225 may be configured to provide the "k" variable to the sub-manager.

In some example implementations, QoE detection manager 225 may use the following formula to determine the inter-arrival latency ($l_t$) associated with switching from an active encoding device 230 to an inactive encoding device 230:

$l_t = l_w + l_i$, and $l_w = \max(t)^k_r$; $1 \le k \le N_i$; $r$ as a subset of $[1,R]$ In the example formula, $l_w$ may refer to the latency based on the maximum amount of time associated with activating ("waking up") the back-up encoding device 230. If the content stream is switched from one active encoding device 230 to another active encoding device 230, then $l_w=0$ since there is no inter-arrival latency associated with activating an inactive encoding device 230. This results in the formula being $l_t=l_i$. While the above formula has the above-defined variables, the formula may have fewer of the above-defined variables and/or different variables.

While the example described with regard to FIG. 4A relates to a QoE detection manager 225, there may be additional QoE detection managers 225 executed on network device 220. Each additional QoE detection manager 225 may be configured in a similar manner to that discussed in FIG. 4A.

While a series of blocks has been described with regard to FIG. 4A, the blocks and/or the order of the blocks may be modified in other implementations. Further, non-dependent blocks may be performed in parallel.

Figure 4B:
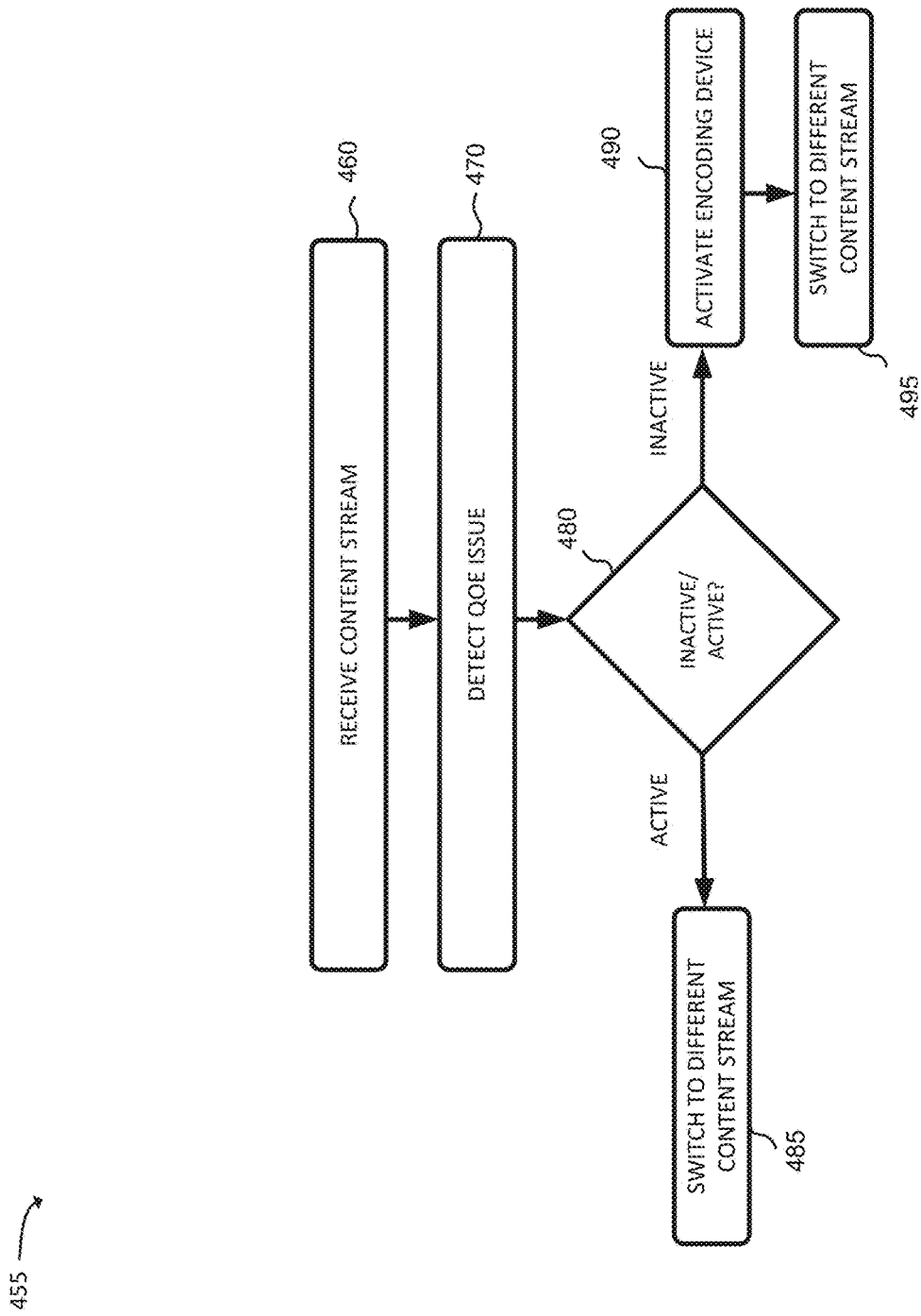
FIG. 4B is a flow chart of an example process for detecting and correcting a quality of experience issue.

FIG. 4B is a flow chart of an example process 455 for detecting and correcting a QoE issue. In one example implementation, process 400 may be performed by network device 220. In another example implementation, one or more blocks of process 400 may be performed by one or more other devices, such as encoding device 230.

Process 455 may include receiving a content stream (block 460). For example, a sub-manager of QoE detection manager 225 may receive a content stream from an encoding device 230. Each sub-manager, associated with QoE detection manager 225, may buffer a particular amount of the content stream based on the buffer size determined with regard to FIG. 4A.

Network device 220 may determine which one or more of the content streams are sent to user device 210. For example, network device 220 may store information that a particular content stream is sent based on the request for content from user device 210. For example, if user device 210 is requesting a content stream associated with a particular language (e.g., Spanish), then network device 220 may send that particular content stream to user device 210.

Process 455 may include detecting a QoE issue (block 470). For example, QoE detection manager 225 may detect a QoE issue associated with one or more content streams from one or more encoding devices 230.

QoE detection manager 225 may determine that one or more encoding devices 230, which are providing content streams (including video and/or audio content) to network device 220, have failed. QoE detection manager 225 may determine that encoding device 230 has failed if a sub-manager does not receive a content stream for a particular amount of time (e.g., every 0.002 seconds, 0.001 seconds, 0.004 seconds, etc.) after commencing to send the content stream to user device 210.

Alternatively, QoE detection manager 225 may determine that one or more of the content streams has QoS issues. One or more content streams may have packet losses, jitter issues, and/or other issues that may be associated with issues within the network (e.g., traffic congestion) or issues associated with encoding device 230 (e.g., hardware issues).

QoE detection manager 225 may determine that when the QoE issue is associated with a value that satisfies a threshold level (e.g., the jitter rate is greater than a particular rate), QoE detection manager 225 may switch over from a content stream having a QoE issue to another content stream without a QoE issue. QoE detection manager 225 may determine that the content stream may be switched to another content stream from the same encoding device 230 or from another encoding device 230, depending on what the QoE issue is.

Additionally, or alternatively, QoE detection manager 225 may determine that the content stream is not compatible for distribution to user device 210 (e.g., user device 210 hardware is not compatible with a particular type of content stream, such as digital video broadcast). QoE detection manager 225 may switch to another content stream that is compatible with the hardware associated with user device 210.

QoE detection manager 225 may determine based on the switchover index (described with regard to block 425 in FIG. 4A) which encoding device 230 should provide the other content stream in the event of a QoE issue (as described above) relating the content stream. QoE detection manager 225 may determine (based on the switchover index) to switch to an active encoding device 230 or an inactive encoding device 230.

If the switchover is to an active encoding device (block 480—ACTIVE), then process 455 may include switching to a different content stream (block 485). For example, QoE detection manager 225, based on the configuration information described with regard to FIG. 4A, may switch to another content stream associated with the same encoding device 230 or with a different encoding device 230. Because the content streams have been buffered (described with regard to block 460), the switchover from the content stream (with the QoE issue) to the other content stream may result in no QoE issues, or fewer QoE issues, associated with the user's experience while the user is watching, or listening to, content (associated with the content stream) on user device 210.

If the switchover is to an inactive encoding device (block 480—INACTIVE), then process 455 may include activating an encoding device (block 490). QoE detection manager 225 may send a message to another encoding device 230. The message may activate the other encoding device 230. The other encoding device 230 may begin to receive content from content server 250 and send the content stream to network device 220.

Process 455 may include switching to a different content stream (block 495). For example, QoE detection manager 225 may, based on the configuration information described with regard to FIG. 4A, switch to the other encoding device 230. Because the content streams have been buffered (described with regard to block 460), the switchover from the content stream (with the QoE issue) associated with encoding device 230 to the other content stream (associated with the other encoding device 230) may result in no QoE issues, or fewer QoE issues, associated with the user's experience while the user is watching, or listening to, content (associated with the content stream) on user device 210.

While a series of blocks has been described with regard to FIG. 4B, the blocks and/or the order of the blocks may be modified in other implementations. Further, non-dependent blocks may be performed in parallel.

Figure 5:
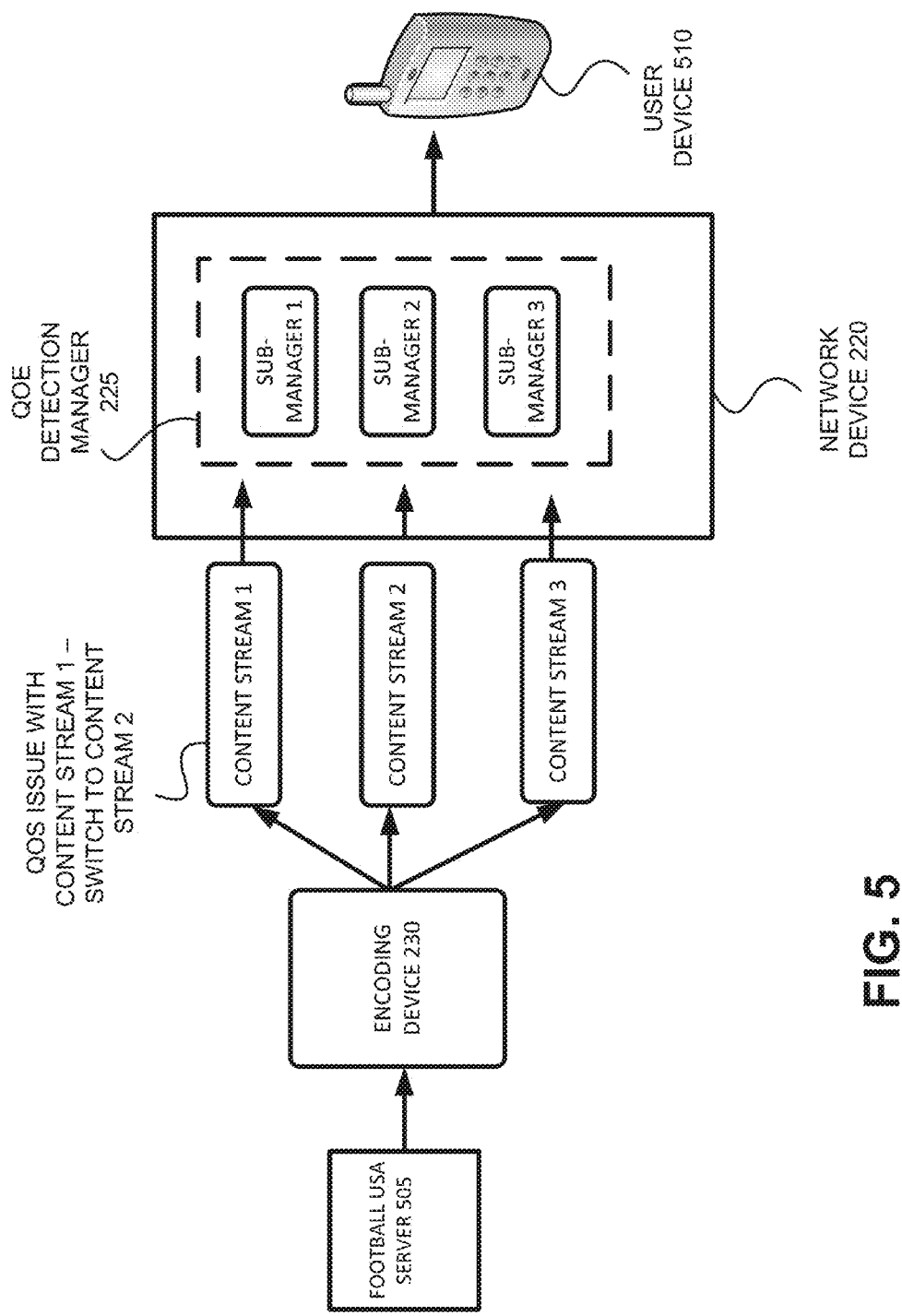
FIG. 5 is an example process for detecting and correcting quality of experience issues.

FIG. 5 is a diagram of an example process for detecting and correcting QoE issues. FIG. 5 shows QoE detection manager 225, network device 220, encoding device 230, Football USA server 505, and user device 510. Football USA server 505 may correspond to content server 250 described with regard to FIG. 2. User device 510 may correspond to user device 210 described with regard to FIG. 2.

As shown in FIG. 5, QoE detection manager 225 has sub-manager 1, sub-manager 2, and sub-manager 3. Assume that each sub-manager receives a different content stream from encoding device 230 (sub-manager 1 receives content stream 1, sub-manager 2 receives content stream 2, and sub-manager 3 receives content stream 3). Encoding device 230 may receive a content feed from Football USA server 505 and may split the content feed into three different content streams with different levels of QoS. Assume that content stream 1 has a QoS level of QCI 4, content stream 2 has a QoS level of QCI 5, and QoS level of QCI 2. Assume that all of the content streams carry the same video of a football game. Encoding device 230 sends the content streams to network device 220. Assume that network device 220 is configured to send content stream 1 to user device 510.

Sub-manager 1, sub-manager 2, and sub-manager 3 may each buffer by determining a buffer size for content stream 1, content stream 2, and content stream 3, respectively. The buffer may be used to buffer a content stream so that if a switchover from one content stream to another content stream is required, the switchover does not result in any QoE issues for the user of user device 510. Assume that QoE detection manager 225 is configured to switch from content stream 1 to content stream 2 in the event of a failure of content stream 1.

Assume that, at a later time, the sub-manager 1 detects a jitter value of 15 ms occurring in content stream 1. Sub-manager 1 may send information regarding the jitter value to QoE detection manager 225. QoE detection manager 225 may determine that the jitter value exceeds a threshold level of 10 ms (stored by QoE detection manager 225). Since the jitter value exceeds the threshold level, QoE detection manager 225 determines that the jitter value will result in a QoE issue for the user of user device 210. As a result of the QoE issue, QoE detection manager 225 may switchover from content stream 1 to content stream 2. QoE detection manager 225 may send a message to network device 220 to send content stream 2, instead of content stream 1, to user device 210. Network device 220 receives the message and sends content stream 2 to user device 210.

Because the content streams have been buffered, the switchover from content stream 1 to content stream 2 may result in no QoE issues associated with the user's experience while the user is watching the football game content (being sent from Football USA 505 server) on user device 210.

Implementations, described herein, may provide a system and/or method for using a QoE detection manager to buffer multiple content streams so that in the event that the QoE detection manager detects a QoE issue (e.g., jitter, packet losses, etc., for a content stream or the failure of an encoding device, associated with a content stream), the buffering of the multiple content streams may result in a reduction of the effect of the QoE issue on a user's experience while the user is watching, or listening to, content, associated with the content stream, on a user device.

The foregoing description provides illustration and description, but is not intended to be exhaustive or to limit the implementations to the precise form disclosed. Modifications and variations are possible in light of the above disclosure or may be acquired from practice of the implementations.

It will be apparent that aspects described herein may be implemented in many different forms of software, firmware, and hardware in the implementations illustrated in the figures. The actual software code or specialized control hardware used to implement these aspects does not limit the implementations. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method, comprising:
receiving, by a network device, configuration information for a first content stream and a second content stream,
the first content stream being associated with a first encoding device, and
the second content stream being associated with a second encoding device;
determining, by the network device, a buffer size for the first content stream based on a switchover time from the first content stream to the second content stream,
the switchover time being based on at least one of:
a first amount of time associated with activating the second encoding device,
a second amount of time associated with the second encoding device receiving the second content stream from a server device, or
a third amount of time associated with receiving, by the network device,
the second content stream from the second encoding device;
receiving, by the network device, the first content stream from the first encoding device;
buffering, by the network device and based on the buffer size, the first content stream;
sending, by the network device, the first content stream to a user device;
determining, by the network device, that the first content stream has a quality of experience issue; and
switching, by the network device and during the switchover time, from sending the first content stream to the user device to sending the second content stream to the user device based on determining that the first content stream has the quality of experience issue,
the first content stream being sent to the user device during the switchover time.

2. The method of claim 1, where determining the buffer size comprises:
   determining an inter-arrival latency value; and
   determining the buffer size based on the inter-arrival latency value.

3. The method of claim 1, where determining that the first content stream has the quality of experience issue comprises:
   determining that the first content stream has not been received from the first encoding device for a particular amount of time; and
   determining that the first content stream has the quality of experience issue based on determining that the first content stream has not been received from the first encoding device for the particular amount of time.

4. The method of claim 1,
   where the second encoding device is inactive; and
   where switching from sending the first content stream to the user device to sending the second content stream to the user device comprises:
      activating the second encoding device, and
      switching from sending the first content stream to the user device to sending the second content stream to the user device after activating the second encoding device.

5. The method of claim 4, where the first amount of time associated with activating the second encoding device includes a maximum amount of time associated with activating the second encoding device.

6. The method of claim 1, where determining that the first content stream has the quality of experience issue comprises:
   determining that the first content stream is associated with a jitter value that satisfies a jitter value threshold; and
   determining that the first content stream has the quality of experience issue based on determining that the first content stream is associated with the jitter value that satisfies the jitter value threshold.

7. The method of claim 1, where switching from sending the first content stream to the user device to sending the second content stream to the user device comprises:
   switching from sending the first content stream to the user device to sending the second content stream to the user device based on a switchover index,
      the switchover index indicating that the second content stream is to be sent to the user device based on the first content stream having the quality of experience issue.

8. A non-transitory computer-readable medium storing instructions, the instructions comprising:
   one or more instructions that, when executed by one or more processors of a device, cause the one or more processors to:
      receive configuration information for a first content stream and a second content stream,
         the first content stream being associated with a first encoding device, and
         the second content stream being associated with a second encoding device;
      determine a buffer size for the first content stream based on a switchover time from the first content stream to the second content stream,
         the switchover time being based on at least one of:
            a first amount of time associated with activating the second encoding device,
            a second amount of time associated with the second encoding device receiving the second content stream from a server device, or
            a third amount of time associated with receiving, by the device, the second content stream from the second encoding device;
      receive the first content stream from the first encoding device;
      buffer, based on the buffer size, the first content stream;
      send the first content stream to a user device;
      determine that the first content stream has a quality of experience issue; and
      switch, during the switchover time, from sending the first content stream to the user device to sending the second content stream to the user device based on determining that the first content stream has the quality of experience issue,
         the first content stream being sent to the user device during the switchover time.

9. The non-transitory computer-readable medium of claim 8, where the one or more instructions, that cause the one or more processors to determine the buffer size, cause the one or more processors to:
   determine an inter-arrival latency value; and
   determine the buffer size based on the inter-arrival latency value.

10. The non-transitory computer-readable medium of claim 8, where the one or more instructions, that cause the one or more processors to determine that the first content stream has the quality of experience issue, cause the one or more processors to:
   determine that the first content stream has not been received from the first encoding device for a particular amount of time; and
   determine that the first content stream has the quality of experience issue based on determining that the first content stream has not been received from the first encoding device for the particular amount of time.

11. The non-transitory computer-readable medium of claim 8,
   where the second encoding device is inactive; and
   where the one or more instructions, that cause the one or more processors to switch from sending the first content stream to the user device to sending the second content stream to the user device, cause the one or more processors to:
      activate the second encoding device, and
      switch from sending the first content stream to the user device to sending the second content stream to the user device after activating the second encoding device.

12. The non-transitory computer-readable medium of claim 11, where the first amount of time associated with activating the second encoding device includes a maximum amount of time associated with activating the second encoding device.

13. The non-transitory computer-readable medium of claim 8, where the one or more instructions, that cause the one or more processors to determine that the first content stream has the quality of experience issue, cause the one or more processors to:
   determine that the first content stream is associated with a jitter value that satisfies a jitter value threshold; and
   determine that the first content stream has the quality of experience issue based on determining that the first content stream is associated with the jitter value that satisfies the jitter value threshold.

14. The non-transitory computer-readable medium of claim 8, where the one or more instructions, that cause the one or more processors to switch from sending the first content stream to the user device to sending the second content stream to the user device, cause the one or more processors to:
  switch from sending the first content stream to the user device to sending the second content stream to the user device based on a switchover index,
    the switchover index indicating that the second content stream is to be sent to the user device based on the first content stream having the quality of experience issue.

15. A device, comprising:
  one or more memories; and
  one or more processors, communicatively coupled to the memories, to:
    receive configuration information for a first content stream and a second content stream,
      the first content stream being associated with a first encoding device, and
      the second content stream being associated with a second encoding device;
    determine a buffer size for the first content stream based on a switchover time from the first content stream to the second content stream,
      the switchover time being based on at least one of:
        a first amount of time associated with activating the second encoding device,
        a second amount of time associated with the second encoding device receiving the second content stream from a server device, or
        a third amount of time associated with receiving, by the device, the second content stream from the second encoding device;
    receive the first content stream from the first encoding device;
    buffer the first content stream based on the buffer size;
    send the first content stream to a user device;
    determine that the first content stream has a quality of experience issue; and
    switch, during the switchover time, from sending the first content stream to the user device to sending the second content stream to the user device based on determining that the first content stream has the quality of experience issue,
      the first content stream being sent to the user device during the switchover time.

16. The device of claim 15, where the one or more processors, when determining the buffer size, are to:
  determine an inter-arrival latency value; and
  determine the buffer size based on the inter-arrival latency value.

17. The device of claim 15, where the one or more processors, when determining that the first content stream has the quality of experience issue, are to:
  determine that the first content stream has not been received from the first encoding device for a particular amount of time; and
  determine that the first content stream has the quality of experience issue based on determining that the first content stream has not been received from the first encoding device for the particular amount of time.

18. The device of claim 15,
  where the second encoding device is inactive; and
  where the one or more processors, when switching from sending the first content stream to the user device to sending the second content stream to the user device, are to:
    activate the second encoding device, and
    switch from sending the first content stream to the user device to sending the second content stream to the user device after activating the second encoding device.

19. The device of claim 18, where the first amount of time associated with activating the second encoding device includes a maximum amount of time associated with activating the second encoding device.

20. The device of claim 15, where the one or more processors, when determining that the first content stream has the quality of experience issue, are to:
  determine that the first content stream is associated with a jitter value that satisfies a jitter value threshold; and
  determine that the first content stream has the quality of experience issue based on determining that the first content stream is associated with the jitter value that satisfies the jitter value threshold.

* * * * *